US011836013B2

(12) United States Patent
Li et al.

(10) Patent No.: US 11,836,013 B2
(45) Date of Patent: Dec. 5, 2023

(54) SYSTEMS AND METHODS FOR DYNAMICALLY ADJUSTING OPENING FORCE

(71) Applicant: Microsoft Technology Licensing, LLC, Redmond, WA (US)

(72) Inventors: Han Li, Sammamish, WA (US); Masaaki Fukumoto, Beijing (CN); Nathan Michael Thome, Kirkland, WA (US); James David Holbery, Redmond, WA (US); Paul Christopher Kos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 17/761,906

(22) PCT Filed: Sep. 18, 2020

(86) PCT No.: PCT/US2020/051612
§ 371 (c)(1),
(2) Date: Mar. 18, 2022

(87) PCT Pub. No.: WO2021/055834
PCT Pub. Date: Mar. 25, 2021

(65) Prior Publication Data
US 2022/0374052 A1    Nov. 24, 2022

(30) Foreign Application Priority Data
Sep. 19, 2019  (NL) ...................... 2023857

(51) Int. Cl.
*G06F 1/16* (2006.01)
(52) U.S. Cl.
CPC .......... *G06F 1/1677* (2013.01); *G06F 1/1679* (2013.01); *G06F 1/1681* (2013.01)
(58) Field of Classification Search
CPC .... G06F 1/1626; G06F 1/1632; G06F 1/1643; G06F 1/1654; G06F 1/1677; G06F 1/1679; G06F 1/1681; G06F 3/0488
See application file for complete search history.

(56) References Cited

U.S. PATENT DOCUMENTS 6,044,473 A  *  3/2000  Kim ...................... G06F 1/1616
                                                    361/679.55
6,366,440 B1 *  4/2002  Kung ..................... E05C 19/16
                                                    361/679.55
(Continued)

*Primary Examiner* — Adrian S Wilson
(74) *Attorney, Agent, or Firm* — RAY QUINNEY & NEBEKER P.C.; Paul N. Taylor

(57) ABSTRACT

A method of controlling opening resistance in an electronic device includes maintaining the electronic device in a closed state via a resistive force, wherein the resistive force is applied by at least one of: a hinge of the electronic device, and magnets of the electronic device. The method further includes using a sensor on an underside of the electronic device to detect a force applied to a first portion of the electronic device and determining that the force corresponds to a user initiating opening of the electronic device. In accordance with the determination, the method further includes reducing the resistive force to assist the user in opening the electronic device.

20 Claims, 6 Drawing Sheets

(56) References Cited

U.S. PATENT DOCUMENTS

| | | | | |
|---|---|---|---|---|
| 7,345,677 B2* | 3/2008 | Ing | G06F 3/0433 | 345/173 |
| 7,583,500 B2* | 9/2009 | Ligtenberg | G06F 1/1616 | 361/147 |
| 7,775,567 B2* | 8/2010 | Ligtenberg | E05C 19/16 | 292/DIG. 37 |
| 8,181,192 B2* | 5/2012 | Ezawa | G11B 33/027 | 720/655 |
| 8,912,913 B2* | 12/2014 | Martins | G06F 1/1613 | 340/686.1 |
| 9,075,566 B2* | 7/2015 | Whitt, III | G06F 1/166 | |
| 9,836,084 B2* | 12/2017 | Chau | G06F 1/1626 | |
| 10,120,420 B2* | 11/2018 | Bathiche | G06F 1/1632 | |
| 10,353,431 B2* | 7/2019 | Chau | G06F 1/1654 | |
| 10,890,942 B2* | 1/2021 | Chau | G06F 1/1654 | |
| 11,556,153 B2* | 1/2023 | Remaley | H02N 13/00 | |
| 2008/0006762 A1* | 1/2008 | Fadell | G06F 3/0383 | 250/201.1 |
| 2009/0284465 A1* | 11/2009 | Oki | G06F 3/044 | 73/514.32 |
| 2011/0037734 A1* | 2/2011 | Pance | G06F 3/016 | 345/177 |
| 2011/0038114 A1* | 2/2011 | Pance | G06F 3/0227 | 361/679.01 |
| 2011/0043227 A1* | 2/2011 | Pance | H03K 17/962 | 324/681 |
| 2011/0107958 A1* | 5/2011 | Pance | G06F 3/016 | 116/205 |
| 2012/0023597 A1* | 1/2012 | Bilbrey | H01R 13/641 | 335/207 |
| 2012/0280917 A1* | 11/2012 | Toksvig | G06F 1/1626 | 345/173 |
| 2014/0118930 A1* | 5/2014 | Sedon | G06F 21/88 | 361/679.56 |
| 2014/0204512 A1* | 7/2014 | Chen | G06F 1/1677 | 361/679.01 |
| 2014/0210629 A1* | 7/2014 | Martins | G06F 1/1616 | 340/686.1 |
| 2015/0234771 A1* | 8/2015 | Wu | G06F 13/4081 | 361/679.41 |
| 2015/0268699 A1* | 9/2015 | Bathiche | G06F 1/1649 | 345/1.3 |
| 2015/0277492 A1* | 10/2015 | Chau | G06F 1/1643 | 361/679.43 |
| 2018/0275724 A1* | 9/2018 | Lin | G06F 1/22 | |
| 2018/0329508 A1* | 11/2018 | Klein | G06F 1/1618 | |
| 2021/0004060 A1* | 1/2021 | Remaley | G06F 1/1679 | |

* cited by examiner

SYSTEMS AND METHODS FOR DYNAMICALLY ADJUSTING OPENING FORCE

BACKGROUND

Background and Relevant Art

Many electronic devices have a clamshell configuration that, when closed, protects components of the electronic device, such as a keyboard, touchpad, speakers, display, cameras, or other vulnerable components. When opened, the electronic device has greater surface area to allow more options for displaying or otherwise presenting information to a user and receiving inputs through a variety of input mechanisms.

The electronic device should only move between the closed state and the open state when a user intends, and, when open, the electronic device should support the display in a fixed position. In order to protect the vulnerable components, the opening resistance can be increased. Increasing the opening resistance, however, can make opening the electronic device more difficult for a user, degrading the user experience.

BRIEF SUMMARY

An electronic device can have a strong opening resistance and a strong hinge to hold a display in a selected position while providing a positive user experience by dynamically adjusting an opening resistance based on a force applied by a user. For example, the electronic device may include one or more sensors in an underside of the device to detect a shear force experienced by or a movement of the electronic device while the device is closed. The electronic device can then determine whether the detected force or movement corresponds to a recognized opening force that a user may apply to open the electronic device. When the force is recognized as an opening force, the electronic device can reduce a resistive force holding the device closed. If the force is not recognized as an opening force, the resistive force may remain the same, limiting or prevent opening of the electronic device.

In some embodiments, a method of controlling opening resistance in an electronic device includes maintaining the electronic device in a closed state via a resistive force, wherein the resistive force is applied by at least one of: a hinge of the electronic device, and magnets of the electronic device. The method further includes using a sensor on an underside of the electronic device to detect a force applied to a first portion of the electronic device and determining that the force corresponds to a user initiating opening of the electronic device. In accordance with the determination, the method further includes reducing the resistive force to assist the user in opening the electronic device.

In some embodiments, an electronic device includes a first portion and a second portion that are movably connected by a hinge. The first portion is rotatable around an axis of the hinge by application of a force. The electronic device includes a means for measuring at least one component of the force and a means for reducing an opening resistance of the first portion relative to the second portion. The electronic device further includes a processor in data communication with the means for measuring and means for reducing the opening resistance and a computer-readable storage medium in data communication with the processor, the hardware storage device having instructions stored thereon that, when executed by the processor, cause the processor to perform the method described above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a side view of the electronic device of FIG. 1 experiencing an opening force, according to at least embodiment of the present disclosure;

FIG. 2-2 is a side view of the electronic device of FIG. 1 illustrating components of an opening force, according to at least embodiment of the present disclosure;

FIG. 2-3 is a side view of the electronic device of FIG. 1 frictionally engaged with a surface, according to at least embodiment of the present disclosure;

FIG. 2-4 is a side view of the electronic device of FIG. 1 sliding on the surface, according to at least embodiment of the present disclosure;

FIG. 3 is a flowchart illustrating a method of adjusting an opening resistance in an electronic device, according to at least one embodiment of the present disclosure;

FIG. 4-1 is a schematic representation of a magnetic closure mechanism generating an attractive magnetic force, according to at least one embodiment of the present disclosure;

FIG. 4-2 is a schematic representation of the magnetic closure mechanism of FIG. 4-1 generating a repulsive magnetic force, according to at least one embodiment of the present disclosure;

DETAILED DESCRIPTION

Figure 1:
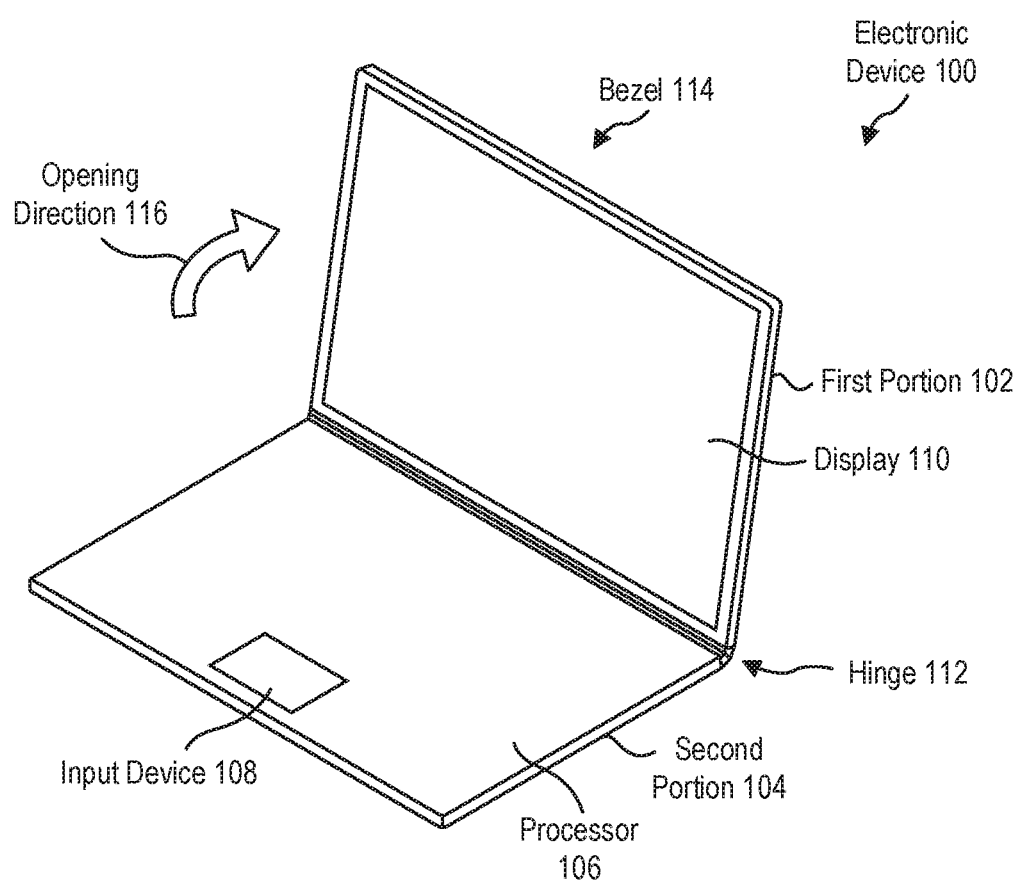
FIG. 1 is a perspective view of an electronic device, according to at least embodiment of the present disclosure.

The present disclosure relates generally to devices, systems, and methods for dynamically adjusting an opening force needed to open an electronic device. In some embodiments, a user may desire to open the electronic device using only one hand or one finger. For example, a laptop may have a clamshell configuration in which a display cover forms a lid of the laptop. A user applying a force to the display cover to open the laptop may apply an opening force to a front edge of the display cover to lift the display cover toward an open state. The opening force may apply a compression force against the bezel of the display cover to create friction to allow the application of an upward force to the display cover to lift the display cover.

The laptop may have one or more mechanisms to hold the laptop in a closed state with the display cover and base in the clamshell configuration. For example, a closure mechanism may apply a closure force between the display cover and the base or a hinge may provide a torque that resists rotation around the hinge axis. Therefore, in some embodiments, the upward force applied by the user may lift the display cover and the base together without moving the first portion relative to the second portion toward the open state. In some embodiments, a compression force applied against a bezel of the display cover while opening the display cover unintentionally slides the laptop across a surface upon which the laptop rests. To improve the user experience, a laptop or other electronic device may identify an opening force applied by a user and dynamically reduce the closure force, reduce the hinge resistance, and/or supplement the opening force to assist the user in opening the electronic device. Identifying an opening force and dynamically reducing the closure force gives the user wide latitude when opening the device. First, it allows the user to use just one hand or finger to open the device. Second, it allows the user to apply the opening force at various locations along the device surface rather than being restricted to applying the force to a particular release mechanism such as a button on the device bezel.

In some embodiments, an electronic device has a first portion and a second portion. The first portion is movable relative to the second portion between a closed state and an open state. In a laptop example, the first portion may be a display cover and the second portion may be a base containing a processor or other electronic components and a keyboard, a touchpad, a cursor thumb stick, a fingerprint reader, other biometric identification device, or other input device. In a foldable handheld device example, the first portion may be a first display cover supporting a first display and the second portion may be a second display cover supporting a second display. In a hybrid computer example, the first portion may be a display cover supporting a display and other electronic components that is detachable from the second portion. In another example, the first portion may include a first touch-sensitive display and the second portion may include a second touch-sensitive display.

In some embodiments, the first portion and second portion are movable relative to one another around a hinge. In some embodiments, the hinge is a single axis hinge, such as a pin hinge that couples the first portion to the second portion and allows rotation around the single axis. In some embodiments, the hinge includes a plurality of axes, such as a multiple axis hinge having determinant motion or a multiple axis hinge having indeterminant motion. In some embodiments, the hinge has a plurality of axes that function in concert to provide a curved hinge between the first portion and second portion.

In some embodiments, the first portion is movable relative to the second portion by a user applying a force to a bezel of the first portion. The first portion is movable relative to the second portion around the hinge from a closed state to an open state in an opening direction. The first portion is movable relative to the second portion around the hinge from the open position to the closed position in a closed direction.

FIG. 1 is a perspective view of an embodiment of an electronic device 100 according to the present disclosure. In some embodiments, the electronic device 100 includes a first portion 102 and a second portion 104. The first portion 102 and second portion 104 are movable relative to one another. In some embodiments, the second portion includes a processor 106, hardware storage device, or other electronic components and a touchpad, keyboard, or other input devices 108. In some embodiments, the hardware storage device includes instructions stored thereon that, when executed by the processor 106, cause the processor 106 to perform any of the methods described herein. In some embodiments, the hardware storage device is a solid-state hardware storage device. In some embodiments, the hardware storage device is a platen-based storage device. In some embodiments, the hardware storage device is an optical disk drive. The first portion 102 includes a display 110 to present visual information to the user. The first portion 102 and second portion 104 are movable relative to one another around a hinge 112 connecting the two portions.

To provide a good user experience, in some embodiments, the hinge 112 has a comparatively high rotational resistance to hold the first portion 102 still and prevent movement of the display 110 during use (e.g., prevent "screen bounce"). During opening of the electronic device 100, the rotational resistance of the hinge 112 may be reduced to allow the user to place the first portion 102 relative to the second portion 104 while limiting and/or preventing the sliding of the electronic device 100 across a surface.

In some embodiments, a closure mechanism (e.g., located in a bezel 114) of the electronic device 100 holds the first portion 102 closed relative to the second portion 104 until the user applies an opening force in an opening direction 116.

The electronic device may include one or more mechanisms that prevent and/or limit the movement of the first portion relative to the second portion. In some embodiments, a closure mechanism applies a force to maintain the first portion and second portion in the closed state. In some embodiments, the hinge of the electronic device provides a rotational resistance that holds the first portion and second portion relative to one another at any selected angle. In some embodiment, the hinge of the electronic device provides a rotational resistance that holds the first portion and second portion relative to one another at any selected angle and a closure mechanism provides an additional closure force that helps maintain the electronic device in a closed state.

In some embodiments, the closure mechanism includes a mechanical latch that connects the first portion to the second portion when in the closed state. In some embodiments, the closure mechanism includes a pair of magnets or magnetic materials that generate an attractive force between the first portion and second portion. In some embodiments, the closure mechanism includes a first magnetic element in the first portion and a second magnetic element in the second portion that generate an attractive force at or near the closed state.

In some embodiments, the magnetic elements include a permanent magnet. In some embodiments, the magnetic elements include an electromagnet. In some embodiments, at least one of the magnetic elements is a ferromagnetic material, which becomes magnetic in the presence of an applied magnetic field. The pair of magnetic elements may be positioned anywhere in the first portion and/or second portion to generate an attractive force therebetween. In some embodiments, the pair of magnetic elements is positioned in the bezel of the first portion and/or second portion.

In some embodiment, the pair of magnetic elements are aligned such that the first magnetic element shares an axis with the second magnetic element. In some embodiments, the attractive force between the first magnetic element and second magnetic elements is adjustable by changing the alignment of the first magnetic element relative to the second magnetic element.

To overcome the closure force and/or the rotational resistance of the hinge, a user may apply an opening force to the first portion relative to the second portion. In some embodiments, the user applies the opening force in a direction that is inward (e.g., toward the hinge of the electronic device) and upward (e.g., a torque around the hinge in an opening rotational direction). The opening force applied by the user can be decomposed relative to the hinge axis (or axes in embodiments with a plurality of hinge axes and/or a dynamic hinge) into the radial component and the rotational component of the opening force.

Figures 1, 2:
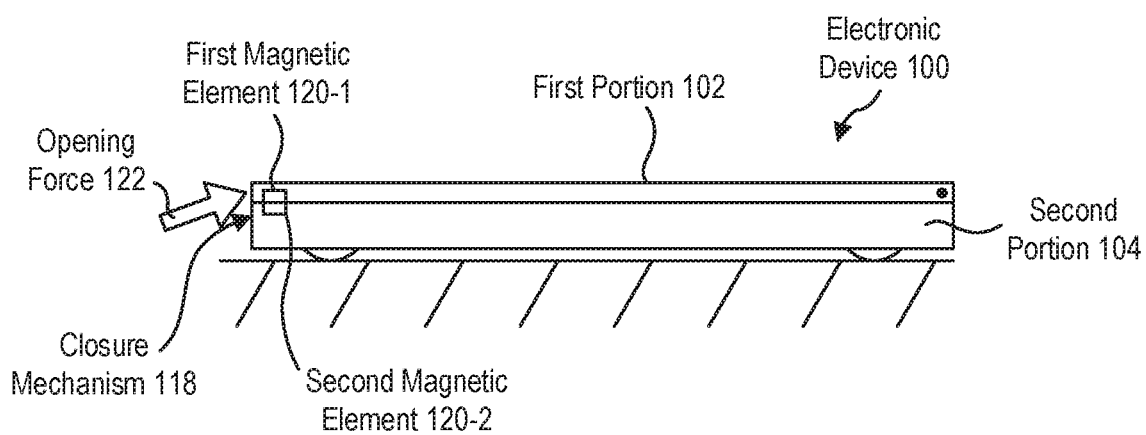
Figure 2:
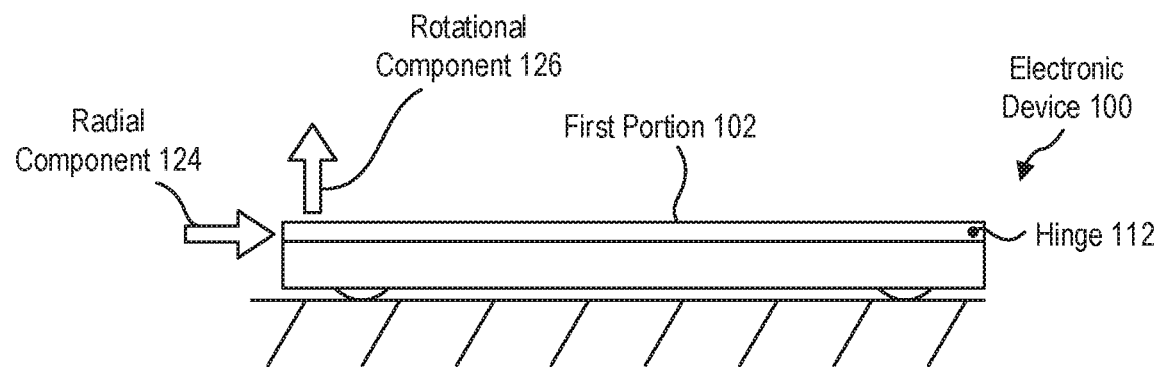

FIG. 2-1 is a side view of the electronic device 100 of FIG. 1. In some embodiments, a closure mechanism 118 includes a first magnetic element 120-1 and a second magnetic element 120-2 positioned in the first portion 102 and the second portion 104, respectively. The first magnetic element 120-1 and second magnetic element 120-2 may generate an attractive force to maintain the electronic device 100 in a closed state until the application of an opening force 122 by a user In some embodiments, such as a laptop being opened on a tabletop, the components of the opening force each apply a force acting against environmental forces. In some embodiments, the rotational component of the opening force applies a force against gravity and against the rotational resistance of the hinge. In some embodiments, the rotational component of the opening force applied a force against gravity and against the closure force of the closure mechanism. In some embodiments, the rotational component applies a force against gravity, against the rotational resistance of the hinge, and against the closure force of the closure mechanism.

FIG. 2-2 illustrates the electronic device 100 of FIG. 2-1 with the opening force decomposed into a radial component 124 oriented at the hinge 112 and a rotational component 126 applied to the first portion 102. In some embodiments, the radial component of the opening force generates a friction force between the user's hand and the first portion. The friction force is relative to the force with which the first portion pushes back on the user's hand (e.g., Newtonian Third Law pair). The force with which the first portion 102 pushes back is related to a friction force 130 between the electronic device 100 and a surface upon which the electronic device rests as shown in FIG. 2-3.

Conventionally, an underside of the second portion includes a high friction material in a sheet affixed to the underside or in feet 128 to increase the friction between the electronic device and the surface upon which it rests. However, a high friction material, such as a soft rubber or silicone has unfavorable wear resistance properties and low tear strength. Additionally, to generate the necessary opening force, a user is prone to applying a large radial force (e.g., radial component 124) that overcomes the frictional force of the feet 128 of the electronic device 100, causing the electronic device to slide across the surface upon which it rests, such as shown in FIG. 2-4.

In some embodiments according to the present disclosure, an electronic device identifies an applied opening force and reduced the amount of opening force necessary to move the device toward the open state. In some embodiments, reducing the opening force necessary improves wear resistance of a surface or feet on the underside of the electronic device. In some embodiments, reducing the opening force necessary limits the sliding or other displacement of the electronic device on the surface upon which it rests, improving the user experience.

Figures 2, 3:
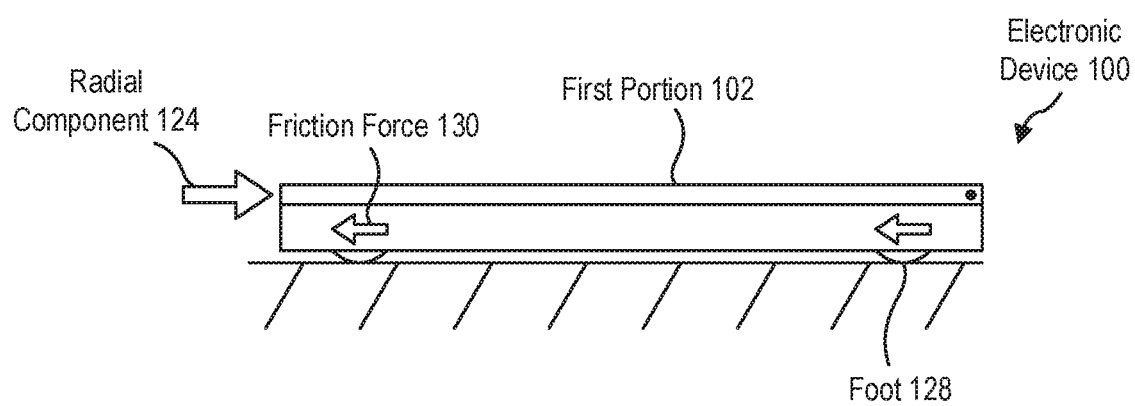
Figures 2, 3, 4:
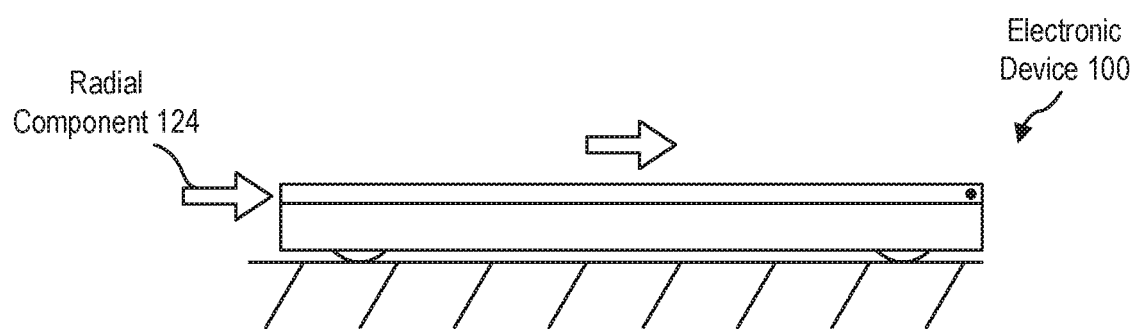
Figure 3:
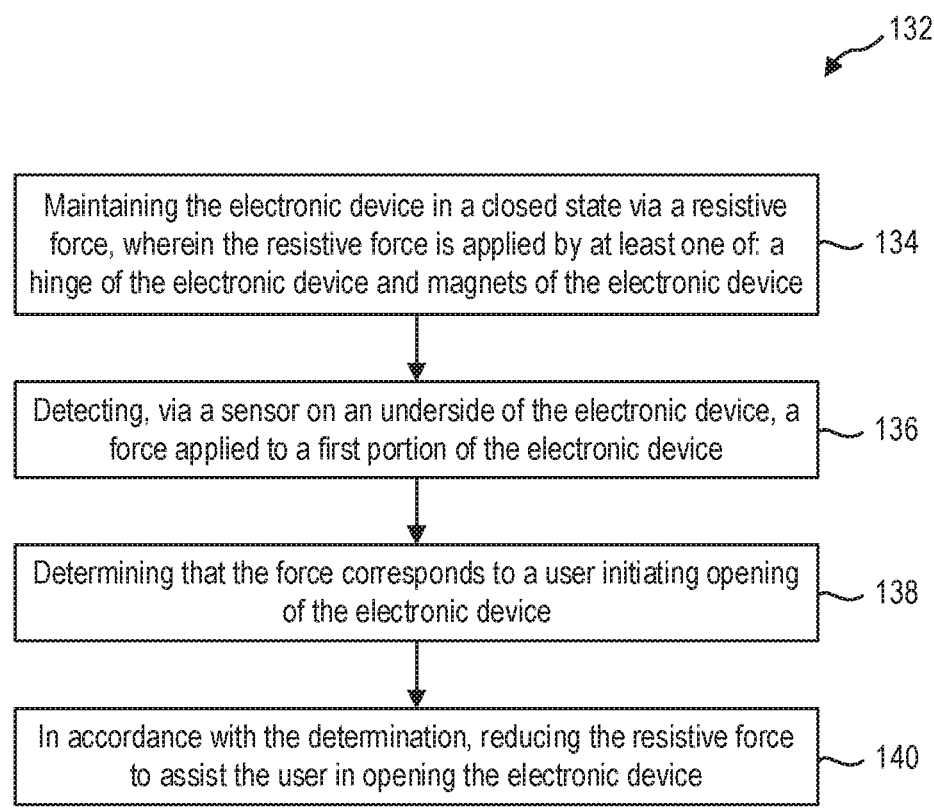
Figures 1, 4:
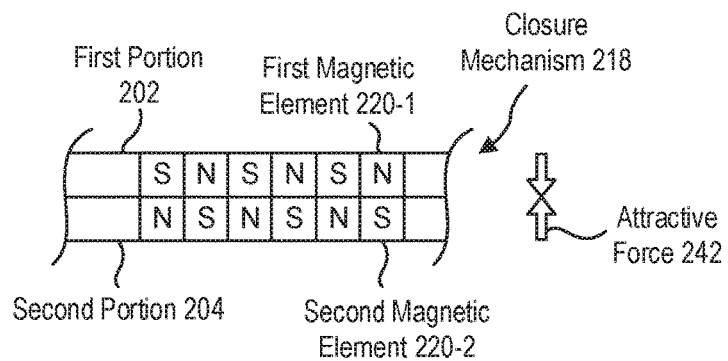
Figures 2, 4:
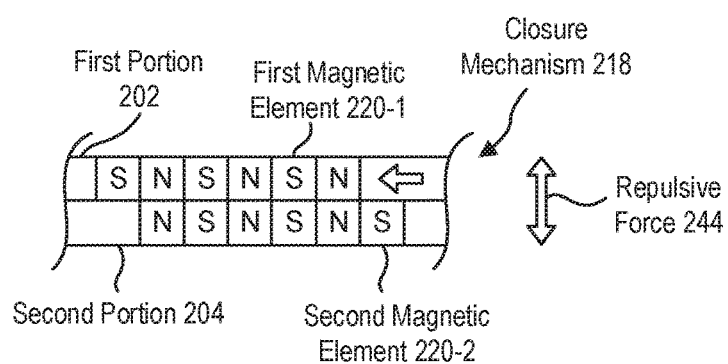

FIG. 3 is a flowchart illustrating an embodiment of a method of adjusting a resistive force when opening an electronic device. In some embodiments according to the present disclosure, a method (132) for dynamically adjusting the opening force necessary to open an electronic device includes maintaining (134) the electronic device in a closed state via a resistive force. In some embodiments, the resistive force is applied by a hinge of the electronic device. In some embodiments, the resistive force is applied by a pair of magnetic elements of the electronic device. In some embodiments, the resistive force is applied by a hinge of the electronic device and a pair of magnetic elements of the electronic device.

The method further comprises detecting (136) a force applied to a first portion of the electronic device with a sensor located on an underside of the electronic device. In some embodiments, the sensor is a sensor that detects movement of the second portion of the electronic device relative to a surface upon which the electronic device rests. In some embodiments, the sensor is a sensor that detects a shear force between the second portion and a surface upon which the electronic device rests. In some embodiments, the shear force sensor is positioned in a foot of the electronic device. In some embodiments, the shear force sensor is positioned on a lower surface of the electronic device where the lower surface contacts the surface upon which the electronic device rests.

In some embodiments, the method includes determining (138) that the detected force corresponds to a user initiating opening of the electronic device and, in accordance with the determination, reducing (140) the resistive force to assist the user in opening the electronic device. Because a force can be applied to the electronic device during transport or storage, for example, while a laptop is being carried in a backpack or sleeve, the method may limit or prevent false positives by only reducing the resistive force when the detected force applied to the first portion corresponds to an opening force applied by the user to open the device.

Determining that the force corresponds to a user initiating opening of the electronic device may include measuring the components of the detected force, measuring an orientation of the electronic device, measuring a second force applied to the electronic device by a user, other techniques, or combinations thereof. In some embodiments, measuring the components of the detected force includes measuring a radial force and a rotational force on the first portion. In some embodiments, one or more force sensors on the underside of the electronic device (e.g., the lower surface of the second portion) measures a first component applied to the underside of the electronic device in a shear direction (e.g., a shear force which corresponds to a radial force toward the hinge axis) and a second component applied in a normal direction to the underside of the electronic device (e.g., a rotational force).

In some embodiments, the second component is determined to correspond to an opening force when the second component produces a net reduction in the force applied to the underside of the electronic device. For example, when applying an opening force, the laptop or other electronic device may be resting on a tabletop or other horizontal surface. The second component may be detected by measuring a reduction in the gravitation force between the underside of the electronic device and the tabletop or other horizontal surface. For example, at least part of a rotational force applied to the first portion may be transmitted to the second portion due to the resistive force. The transmitted portion of the rotational force may lift or lighten the second portion, which is detectable as a reduction in a compressive force normal to the underside of the electronic device.

In some embodiments, determining that the force corresponds to a user initiating opening of the electronic device includes measuring an orientation of the electronic device. In some embodiments, the resistive force is reduced only when the electronic device is determined to be oriented approximately horizontally. For example, an applied force while a laptop is oriented with the hinge axis vertically relative to gravity indicates the applied force does not correspond to a user opening the laptop. In some embodiments, an electronic device is considered to be oriented horizontally when the lower surface of the second portion of the electronic device is within 20° of horizontal relative to a direction of gravity. In some embodiments, an electronic device is considered to be oriented horizontally when the lower surface of the second portion of the electronic device is within 10° of horizontal relative to a direction of gravity. In some embodiments, an electronic device is considered to be oriented horizontally when the lower surface of the second portion of the electronic device is within 5° of horizontal relative to a direction of gravity. In some embodiments, an electronic device is considered to be oriented horizontally when the lower surface of the second portion of the electronic device is within 2° of horizontal relative to a direction of gravity.

In some examples, a user holding a laptop device on their lap holds the laptop at approximately a 5° to 10° slope away from the user. In some examples, a school desk or auditorium table has a slope up to 20° toward the user.

In some embodiments, the resistive force is reduced when both a shear force and a reduction in the normal force on the underside are detected. For example, a purely radial component (e.g., a shear force) measured by the sensor(s) may not indicate an opening force without a rotational component (e.g., lifting force) measured, as the purely radial component may be a user placing the device in a backpack. In another example, a purely rotational component (e.g., lifting force measured by the sensor(s) may not indicate an opening force without a radial component, as the purely rotational component may be a user picking up the electronic device.

In some embodiments, the resistive force is reduced when one of a shear force and a reduction in the normal force on the underside are detected. For example, an optical sensor may detect a displacement of the electronic device relative to a surface upon which the electronic device rests and reduce the resistive force.

In some embodiments, reducing the resistive force includes lowering the rotational resistance of the hinge of the electronic device and/or lowering the closure force of the magnetic elements of the electronic device. In some embodiments, reducing the resistive force includes lowering the net resistive force by applying an assistive force to counteract at least a portion of the rotational resistance of the hinge and/or the closure force of the magnetic elements.

In some embodiments, lowering the rotational resistance of the hinge of the electronic device includes changing a torque applied by the hinge through a clutch system. For example, a hinge may include one or more clutches positioned in the hinge to engage or disengage frictional elements in the hinge. In some embodiments, lowering the rotational resistance of the hinge of the electronic device includes changing a torque applied by the hinge through eddy currents between magnets in the hinge. For example, changing an electrical current or voltage through a coil in the hinge may alter the rotational resistance of the hinge. In some embodiments, lowering the rotational resistance of the hinge includes change a quantity or property of a fluid in the hinge. For example, a fluid in the hinge can produce a rotational resistance and applying a magnetic field or electrical current tot the fluid can change the viscosity of the fluid, thereby altering the rotational resistance of the hinge.

In some embodiments, reducing the resistive force includes lowering a closure force (e.g., an attractive force) between a first magnetic element in the first portion of the electronic device and a second magnetic element in the second portion of the electronic device. In some embodiments, one or both of the first magnetic element and second magnetic element is an electromagnet. The closure force may be reduced by reducing a current applied to the electromagnet, thereby reducing the strength of the magnetic field of the electromagnet. In some embodiments, a direction of the applied current can be changed, such that a polarity of the electromagnetic is changed. Changing the polarity of the electromagnetic can change the previously attractive force to a repulsive force.

In some embodiments, reducing the attractive force between the first magnetic element and second magnetic element includes changing an alignment of the first magnetic element and the second magnetic element. In some embodiments, the first magnetic element and the second magnetic element are aligned in plane with one another between the first portion and the second portion of the electronic device. In some embodiments, the attractive force between the first magnetic element and the second magnetic element is reduced by translating one or both of the first magnetic element and the second magnetic element transversely away from one another. Moving the first magnetic element and the second magnetic element away from one another may reduce the attractive force therebetween. Moving the magnetic fields of the first magnetic element and the second magnetic element out of alignment may further reduce the attractive force therebetween.

In some embodiments, the first magnetic element and the second magnetic element each include a plurality of magnets with alternating North and South pole orientations. In the closure state, the alternating poles of the first magnetic element are aligned with opposite alternating poles (North-South/South-North) of the second magnetic element producing a net attractive force. When translated transversely, the alternating poles of the first magnetic element may move into alignment with matching alternating poles (N-N/S-S) of the second magnetic element, producing a net repulsive force.

In some embodiments, the attractive force between the first magnetic element and the second magnetic element is reduced by rotating one of the first magnetic element and the second magnetic element relative to one another. For example, when the first magnetic element and the second magnetic element are in a closure state, a North pole of the first magnetic element and South pole of the second magnetic element may be aligned and oriented toward one another, producing an attractive force. When an opening force is detected, one of the first magnetic element and the second magnetic element may be rotated such that the same magnetic poles (N-N/S-S) are oriented toward one another, producing a repulsive force.

FIG. 4-1 and FIG. 4-2 is a schematic representation of an embodiment of a closure mechanism 218 (such as closure mechanism 118 described in relation to FIG. 2-1) according to the present disclosure. In some embodiments, the closure mechanism 218 includes a first magnetic element 220-1 that includes a plurality of magnets with alternating poles in the first portion 202. The closure mechanism 218 includes a second magnetic element 220-2 with a second plurality of magnets with alternative poles in the second portion 204. When the poles of the first magnetic element 220-1 are aligned with opposite poles of the second magnetic element 220-2, a net attractive force 242 between the first portion 202 and second portion 204 is generated.

When one or both of the first magnetic element 220-1 and second magnetic element 220-2 is translated, the poles of the first magnetic element 220-1 may be aligned with matching poles of the second magnetic element 220-2, such as shown in FIG. 4-2. When the poles are aligned with matching poles, a net repulsive force 244 between the first portion 202 and second portion 204 is generated.

In some embodiments, reducing the resistive force includes applying an assistive force to counteract and/or overcome the resistive force. In some embodiments, the assistive force includes a magnetic repulsive force such described in relation to translating or rotating magnets of the closure mechanism. In some embodiments, the assistive force includes changing the polarity of an electromagnet from an attractive force to a repulsive force and/or applying a current to an additional electromagnetic to active the additional electromagnet and apply a repulsive force.

In some embodiments, the assistive force includes applying a mechanical force to move the first portion and second portion apart from one another in an opening rotational direction. For example, an attractive magnetic force between the first portion and second portion decreases rapidly in relation to distance therebetween. Therefore, the resistive force may reduce rapidly after the initial opening of the electronic device.

The mechanical force may be applied by actuator that pushes the first portion away from the second portion in the opening rotational direction. In some embodiments, the actuator is a linear actuator. In some embodiments, the actuator is a piston and cylinder. In some embodiments, the actuator is an electric motor that moves or rotates an arm to apply a force between the first portion and second portion.

Figure 5:
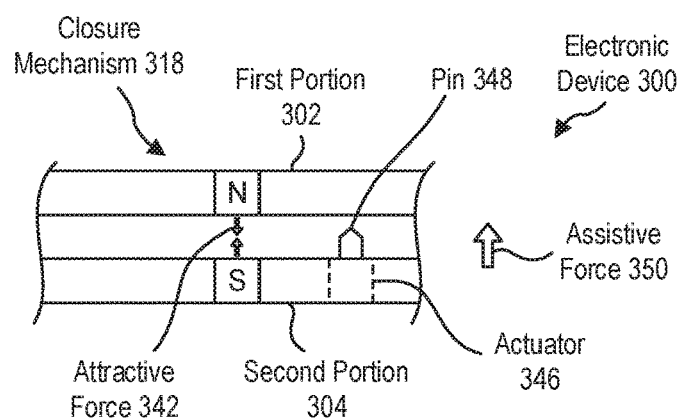
FIG. 5 is a detail view of an actuator applying an assistive force, according to at least one embodiment of the present disclosure.

FIG. 5 is a side view of an embodiment of an electronic device 300 (e.g., electronic device 100 of FIG. 1) with a magnetic closure mechanism 318 that generates a net attractive force 342. In some embodiments, an actuator 346 forces a pin 348 between the first portion 302 and the second portion 304 to provide an assistive force 350 and partially or completely overcome the attractive force 342.

In some embodiments, the resistive force is reduced until the first portion and second portion move apart from one another a predetermined amount. In some embodiments, the resistive force is reduced through a portion of the rotation range of motion around the hinge axis from the closed state in a range having an upper value, a lower value, or upper and lower values including any of 5°, 10°, 15°, 20°, 25°, 30°, 40°, 50°, 60°, 75°, 90°, 120°, or any values therebetween. In some embodiments, the resistive force is reduced through less than the first 5° of rotation around the hinge axis in the opening direction. In some embodiments, the resistive force is reduced through less than the first 15° of rotation around the hinge axis in the opening direction. In some embodiments, the resistive force is reduced through less than the first 30° of rotation around the hinge axis in the opening direction. In some embodiments, the resistive force is reduced through less than the first 45° of rotation around the hinge axis in the opening direction. In some embodiments, the resistive force is reduced through less than the first 90° of rotation around the hinge axis in the opening direction. In some embodiments, the resistive force is reduced through the entire range of motion.

In some embodiments, the resistive force is reduced upon detecting a force initiating opening of the electronic device until movement of the first portion relative to the second portion stops. For example, the resistive force may be reduced while opening the electronic device until the user stops opening the electronic device at any angular relationship of the first portion relative to the second portion. The resistive force may then return to the original resistive force.

In some embodiments where reducing the resistive force includes reducing a rotational resistance of the hinge, restoring the resistive force after the first portions stops moving relative to the second portion aids in the hinge holding a first portion in the user's desired position. In some embodiments where reducing the resistive force includes reducing a magnetic attraction force and/or generating a magnetic repulsion force, restoring the resistive force assists in closing of the electronic device.

In some embodiments, the sensor(s) of the electronic device are located on an underside of the electronic device. In some embodiments, the sensor(s) is a shear force sensor located in a foot of the electronic device. The shear force sensor measures a shear force applied to the foot by a radial force on the first portion. The shear force sensor may be located in (e.g., embedded in) the foot to measure a deformation of the foot under a shear force. In some embodiments, the shear force sensor is positioned in a layer between the foot and the body of the second portion to measure a shear strain between the foot and the body.

The electronic device may include a shear force sensor in a plurality of feet. In some embodiments, shear force sensors are located in the front feet of the electronic device proximate the edge opposite the hinge. In some embodiments, shear force sensors are located in the rear feet of the electronic device proximate the hinge. In some embodiments, the shear force sensor is located in all feet of the electronic device.

In some embodiments, the underside of the electronic device includes compression force sensor. The compression force sensors may allow the electronic device to detect and/or measure a lifting force applied to the electronic device. In some embodiments, a first compression force sensor located in a front foot and a second compression force sensor located in a rear foot allows the electronic device to measure a lifting force applied to the front of the electronic device. For example, at rest in the closed state, the compression force sensors may measure approximately the same force at the front of the second portion and at the rear of the second portion. A lifting force applied to the front edge (e.g., when initially opening the electronic device) may reduce the force measured by the front compression force sensor more relative to the rear compression force sensor.

In some embodiments, the sensor(s) are one or more optical sensors that are located in the underside of the second portion and oriented downward toward the surface upon which the electronic device rests. In some embodiments, the one or more optical sensors include an infrared light optical sensor with an infrared light source having a peak emission in the infrared portion of the light spectrum. In some embodiments, the one or more optical sensors include a visible light optical sensor with a visible light source having a peak emission in the visible portion of the light spectrum to produce a visible color of light or white light. The optical sensor(s) may detect a force applied to the electronic device by measuring movement of the electronic device relative to surface. Movement of the electronic device on the surface indicates a radial force applied to the electronic device. In some embodiments, an opening force applied to the electronic device produces a rotational movement of the electronic device relative to the surface upon which it rests. In some embodiments, a plurality of optical sensors is used to allow the electronic device to measure both translational and rotational displacement.

In some embodiments, an accelerometer, a gyroscope, or other orientation measurement device measures an orientation of the electronic device. When the electronic device is measured to be horizontal on a surface and the optical sensors indicate the device is moving relative to the surface, the movement may be related to an opening force applied by a user.

Figure 6:
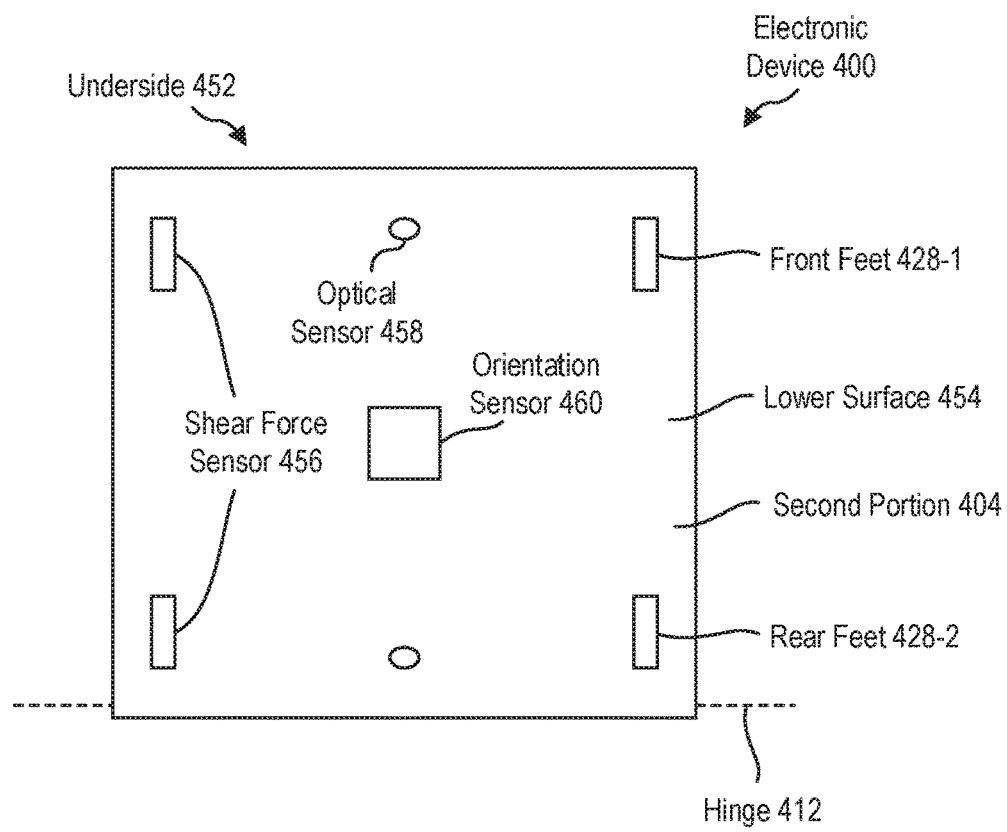
FIG. 6 is a bottom view of an electronic device, according to at least one embodiment of the present disclosure.

FIG. 6 is a bottom view of an embodiment of an electronic device 400 having a plurality of sensors according to the present disclosure. In some embodiments, the underside 452 of the electronic device 400 includes a lower surface 454 of the second portion 404. In some embodiments, a plurality of feet 428 are located on the underside 452 and include a thermoplastic urethane (TPU). In some embodiments, the feet 428 include thermoplastic or thermoset polymer, such as TPU, thermoplastic elastomer, silicone rubber, copolyester, flourosilicone rubber, etc. The plurality of feet 428 can include front feet 428-1, further from the hinge 412, and rear feet 428-2, proximate to the hinge 412. In some embodiments, all of the feet 428 have shear force sensors 456 therein. In some embodiments, only the front feet 428-1 have shear force sensors 456 therein. In some embodiments, only the rear feet 428-2 have shear force sensors 456 therein.

In some embodiments, the electronic device 400 includes a sheet of high friction material positioned on the underside 452, such that the sheet provides the friction force with a surface upon which the electronic device 400 rests. In such embodiments, the shear force sensors 456 are positioned in the electronic device between the sheet and the lower surface 454 of the second portion 404. In some embodiments, the shear force sensors 456 are located in the second portion 404 to measure a shear force applied to the lower surface 454.

In some embodiments, one or more optical sensors 458 are located in the underside 452 to measure movement of the electronic device 400 over a surface upon which the device rests. Because the optical sensors 458 may adversely affect battery life or power consumption if operated continuously, an orientation sensor 460 may allow the electronic device 400 to detect when the second portion 404 is positioned horizontally. In some embodiments in which the device 400 includes an orientation sensor 460, other sensors on the device (e.g., force sensor(s) 456 and/or optical sensor(s) 458) are disabled, or operated in a low power mode (e.g., with reduced resolution), while the orientation sensor 460 indicates that the device 400 is not positioned approximately horizontal.

In some embodiments, the electronic device further includes a force sensor positioned in the first portion and/or in the hinge. The force sensor in the first portion and/or hinge can provide additional confirmation that a force and/or a movement detected by the sensor(s) in the underside of the electronic device is an opening force. For example, a user may push a laptop across a desk to move the laptop without intending to open the laptop. While the shear force sensor(s) and/or optical sensor(s) may measure a shear force and/or displacement of the laptop relative to the surface of the desk, a force sensor located in, for example, a bezel of the first portion or the hinge may confirm the force is applied to the first portion in a manner to open the electronic device.

Figure 7:
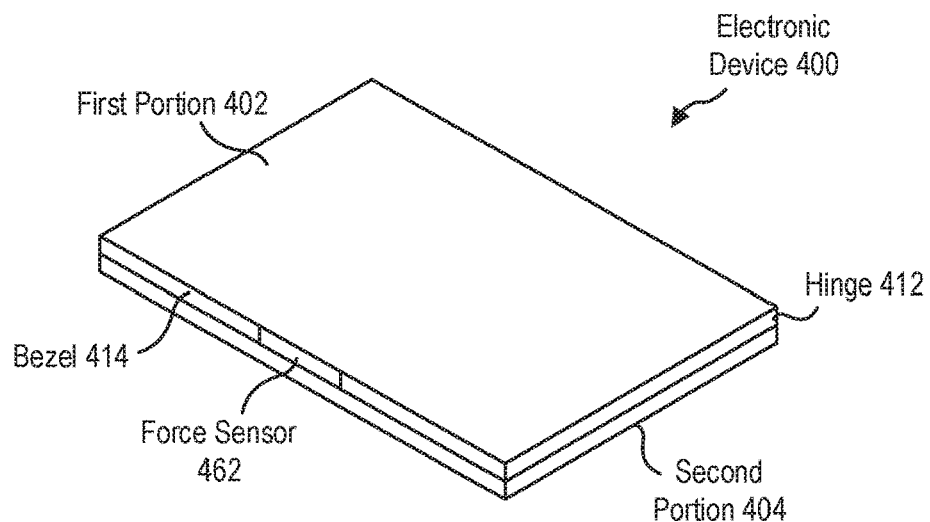
FIG. 7 is a perspective view of the electronic device of FIG. 6, according to at least one embodiment of the present disclosure.

For example, FIG. 7 is a perspective view of the embodiment of an electronic device 400 described in relation to FIG. 6. In some embodiments, the electronic device 400 includes a force sensor 462 positioned in the bezel 414 of the first portion 402. In some embodiments, the force sensor 462 is a capacitive touch sensor. A user may apply an opening force to the electronic device 400 by positioning the user's finger on the bezel 414 and compressing and lifting the first portion 402. The force sensor 462 can help determine whether a force causing a shear force to be detected by the shear force sensors in the feet and/or a displacement detected by the optical sensors in the underside is an opening force applied to the first portion 402 or simply a force applied to the second portion, intending to reposition the electronic device 400.

In some embodiments, the resistive force in the closed state is in a range having an upper value, a lower value, or upper and lower values including any of 2 N, 3 N, 4 N, 5 N, 7.5 N, 10 N, 12.5 N, 15 N, or any values therebetween. In some embodiments, the resistive force in the closed state is greater than 2 N. In some embodiments, the resistive force in the closed state is less than 15 N. In some embodiments, the resistive force in the closed state is between 2 N and 15 N. In some embodiments, the resistive force in the closed state is between 5 N and 10 N.

In some embodiments, an electronic device according to the present disclosure reduces the resistive force in response to determining a user is opening the electronic device by an amount in a range having an upper value, a lower value, or upper and lower values including any of 2 N, 3 N, 4 N, 5 N, 7.5 N, 10 N, 12.5 N, 15 N, or any values therebetween. In some embodiments, the resistive force is reduced by greater than 2 N. In some embodiments, the resistive force is reduced by less than 15 N. In some embodiments, the resistive force is reduced by between 2 N and 15 N. In some embodiments, the resistive force is reduced by between 5 N and 10 N.

In some embodiments, the reduction in force is proportional to the measured opening force. For example, the reduction of the resistive force may be proportional to the measured rotational component of the opening force. In some embodiments, an electronic device according to the present disclosure reduces the resistive force by a proportion of a measured rotational component (e.g., lifting force) of an opening force in a range having an upper value, a lower value, or upper and lower values including any of 10%, 20%, 30%, 40%, 50%, 60%, 70%, 80%, 90%, or 100%, or any values therebetween. In some embodiments, the resistive force is reduced by greater than 20% of the rotational component of the opening force. In some embodiments, the resistive force is reduced by less than 100% of the rotational component of the opening force. In some embodiments, the resistive force is reduced by between 20% and 100% of the rotational component of the opening force. In some embodiments, the resistive force is reduced by between 40% and 60% of the rotational component of the opening force.

In some embodiments, the reduction in force is proportional to the measured movement of the electronic device by an optical sensor in the underside of the device. For example, the reduction of the resistive force may increase as more displacement is detected. In some embodiments, an electronic device according to the present disclosure reduces the resistive force by a relative amount of a measured displacement to a maximum displacement in a range having an upper value, a lower value, or upper and lower values including any of 5 millimeters, 1 centimeter (cm), 2 cm, 3 cm, 4 cm, 6 cm, 8 cm, 10 cm, or any values therebetween. In some embodiments, an electronic device reduces the resistive force according to a ratio of the measured displacement (e.g., by the optical sensor(s)) and the maximum value. For example, for a maximum displacement of 10 cm, a measured 1 cm displacement results in a 1:10 (10%) reduction in the resistive force. In some examples, for a maximum displacement of 2 cm, a measured 1 cm displacement results in a 1:2 (50%) reduction in the resistive force.

In at least some embodiments, an electronic device according to the present disclosure improves a user experience by simplifying the opening of the device. For example, a hinge may firmly hold the display cover of a laptop in position, while the detection and identification of a user opening the display cover may reduce a resistive force and allow the user to move the display cover relative to the base more easily. This may allow a user to open and/or close the electronic device more easily using a single hand. In some embodiments, an electronic device according to the present disclosure limits the sliding of an electronic device across a surface upon which the device rests to no more than 2 centimeters (cm), 5 cm, 10 cm, or other value.

INDUSTRIAL APPLICABILITY

The present disclosure relates generally to systems and methods for dynamically adjusting an opening force of an electronic device. In some embodiments, a user desires to open the electronic device using only one hand. For example, a laptop may have a clamshell configuration in which a display cover forms a lid of the laptop. A user applying a force to the display cover to open the laptop may apply an opening force to a front edge of the display cover to lift the display cover toward an open state. The opening force may apply a compression force against the bezel of the display cover to create friction to allow the application of an upward force to the display cover to lift the display cover.

The laptop may have one or more mechanisms to hold the laptop in a closed state with the display cover and base in the clamshell configuration. For example, a clasp mechanism may apply a closure force between the display cover and the base or a hinge may provide a torque that resists rotation around the hinge axis. Therefore, in some embodiments, the upward force applied by the user lifts the display cover and the base together without moving the first portion relative to the second portion toward the open state. In some embodiments, the compression force applied to the bezel of the display cover simply slides the laptop across a surface upon which the laptop rests. To improve the user experience, a laptop or other electronic device may identify an opening force applied by a user and dynamically reduce the closure force, reduce the hinge resistance, or supplement the opening force to assist the user in opening the electronic device. Dynamically reducing the closure force as described helps to prevent the device from sliding while the user is attempting to open the device, and allows users engaged in multiple simultaneous activities, or with certain physical disabilities, to open the device.

In some embodiments, an electronic device has a first portion and a second portion. The first portion is movable relative to the second portion between a closed state and an open state. In a laptop example, the first portion may be a display cover and the second portion may be a base containing a processor or other electronic components and a keyboard, a touchpad, a cursor thumb stick, a fingerprint reader, other biometric identification device, or other input device. In a foldable handheld device example, the first portion may be a first display cover supporting a first display and the second portion may be a second display cover supporting a second display. In a hybrid computer example, the first portion may be a display cover supporting a display and other electronic components that is detachable from the second portion. In another example, the first portion may include a first touch-sensitive display and the second portion may include a second touch-sensitive display.

In some embodiments, the first portion and second portion are movable relative to one another around a hinge. In some embodiments, the hinge is a single axis hinge, such as a pin hinge that couples the first portion to the second portion and allows rotation around the single axis. In some embodiments, the hinge includes a plurality of axes, such as a multiple axis hinge having determinant motion or a multiple axis hinge having indeterminant motion. In some embodiments, the hinge has a plurality of axes that function in concert to provide a curved hinge between the first portion and second portion.

In some embodiments, the first portion is movable relative to the second portion by a user applying a force to a bezel of the first portion. The first portion is movable relative to the second portion around the hinge from a closed state to an open state in an opening direction. The first portion is movable relative to the second portion around the hinge from the open position to the closed position in a closed direction.

The electronic device may include one or more mechanisms that prevent and/or limit the movement of the first portion relative to the second portion. In some embodiments, a closure mechanism applies a force to maintain the first portion and second portion in the closed state. In some embodiments, the hinge of the electronic device provides a rotational resistance that holds the first portion and second portion relative to one another at any selected angle. In some embodiment, the hinge of the electronic device provides a rotational resistance that holds the first portion and second portion relative to one another at any selected angle and a closure mechanism provides an additional closure force that helps maintain the electronic device in a closed state.

In some embodiments, the closure mechanism includes a mechanical latch that connects the first portion to the second portion when in the closed state. In some embodiments, the closure mechanism includes a pair of magnets or magnetic materials that generate an attractive force between the first portion and second portion. In some embodiments, the closure mechanism includes a first magnetic element in the first portion and a second magnetic element in the second portion that generate an attractive force at or near the closed state.

In some embodiments, the magnetic elements include a permanent magnet. In some embodiments, the magnetic elements include an electromagnet. In some embodiments, at least one of the magnetic elements is a ferromagnetic material, which becomes magnetic in the presence of an applied magnetic field. The pair of magnetic elements may be positioned anywhere in the first portion and/or second portion to generate an attractive force therebetween. In some embodiments, the pair of magnetic elements is positioned in the bezel of the first portion and/or second portion.

In some embodiment, the pair of magnetic elements are aligned such that the first magnetic element shares an axis with the second magnetic element. In some embodiments, the attractive force between the first magnetic element and second magnetic elements is adjustable by changing the alignment of the first magnetic element relative to the second magnetic element.

To overcome the closure force and/or the rotational resistance of the hinge, a user may apply an opening force to the first portion relative to the second portion. In some embodiments, the user applies the opening force in a direction that is inward (e.g., toward the hinge of the electronic device) and upward (e.g., a torque around the hinge in an opening rotational direction). The opening force applied by the user can be decomposed relative to the hinge axis (or axes in embodiments with a plurality of hinge axes and/or a dynamic hinge) into the radial component and the rotational component of the opening force.

In some embodiments, such as a laptop being opened on a tabletop, the components of the opening force each apply a force acting against environmental forces. In some embodiments, the rotational component of the opening force applies a force against gravity and against the rotational resistance of the hinge. In some embodiments, the rotational component of the opening force applied a force against gravity and against the closure force of the closure mechanism. In some embodiments, the rotational component applies a force against gravity, against the rotational resistance of the hinge, and against the closure force of the closure mechanism.

In some embodiments, the radial component of the opening force generates a friction force between the user's hand and the first portion. The friction force is relative to the force with which the first portion pushes back on the user's hand (e.g., Newtonian Third Law pair). The force with which the first portion pushes back is related to a friction between the electronic device and a surface upon which the electronic device rests.

Conventionally, an underside of the second portion includes a high friction material in a sheet affixed to the underside or in feet to increase the friction between the electronic device and the surface upon which it rests. However, a high friction material, such as a soft rubber or silicone has unfavorable wear resistance properties and low tear strength. Additionally, to generate the necessary opening force, a user is prone to applying a large radial force that overcomes the frictional force of the feet of the electronic device, causing the electronic device to slide across the surface upon which it rests.

In some embodiments according to the present disclosure, an electronic device identifies an applied opening force and reduced the amount of opening force necessary to move the device toward the open state. In some embodiments, reducing the opening force necessary improves wear resistance of a surface or feet on the underside of the electronic device. In some embodiments, reducing the opening force necessary limits the sliding or other displacement of the electronic device on the surface upon which it rests, improving the user experience.

In some embodiments according to the present disclosure, a method for dynamically adjusting the opening force necessary to open an electronic device includes maintaining the electronic device in a closed state via a resistive force. In some embodiments, the resistive force is applied by a hinge of the electronic device. In some embodiments, the resistive force is applied by a pair of magnetic elements of the electronic device. In some embodiments, the resistive force is applied by a hinge of the electronic device and a pair of magnetic elements of the electronic device.

The method further comprises detecting a force applied to a first portion of the electronic device with a sensor located on an underside of the electronic device. In some embodiments, the sensor is a sensor that detects movement of the second portion of the electronic device relative to a surface upon which the electronic device rests. In some embodiments, the sensor is a sensor that detects a shear force between the second portion and a surface upon which the electronic device rests. In some embodiments, the shear force sensor is positioned in a foot of the electronic device. In some embodiments, the shear force sensor is positioned on a lower surface of the electronic device where the lower surface contacts the surface upon which the electronic device rests.

In some embodiments, the method includes determining that the detected force corresponds to a user initiating opening of the electronic device and, in accordance with the determination, reducing the resistive force to assist the user in opening the electronic device. Because a force can be applied to the electronic device during transport or storage, for example, while a laptop is being carried in a backpack or sleeve, the method may limit or prevent false positives by only reducing the resistive force when the detected force applied to the first portion corresponds to an opening force applied by the user to open the device.

Determining that the force corresponds to a user initiating opening of the electronic device may include measuring the components of the detected force, measuring an orientation of the electronic device, measuring a second force applied to the electronic device by a user, other techniques, or combinations thereof. In some embodiments, measuring the components of the detected force includes measuring a radial force and a rotational force on the first portion. In some embodiments, one or more force sensors on the underside of the electronic device (e.g., the lower surface of the second portion) measures a first component applied to the underside of the electronic device in a shear direction (e.g., a shear force which corresponds to a radial force toward the hinge axis) and a second component applied in a normal direction to the underside of the electronic device (e.g., a rotational force).

In some embodiments, the second component is determined to correspond to an opening force when the second component produces a net reduction in the force applied to the underside of the electronic device. For example, when applying an opening force, the laptop or other electronic device may be resting on a tabletop or other horizontal surface. The second component may be detected by measuring a reduction in the gravitation force between the underside of the electronic device and the tabletop or other horizontal surface. For example, at least part of a rotational force applied to the first portion may be transmitted to the second portion due to the resistive force. The transmitted portion of the rotational force may lift or lighten the second portion, which is detectable as a reduction in a compressive force normal to the underside of the electronic device.

In some embodiments, determining that the force corresponds to a user initiating opening of the electronic device includes measuring an orientation of the electronic device. In some embodiments, the resistive force is reduced only when the electronic device is determined to be oriented approximately horizontally. For example, an applied force while a laptop is oriented with the hinge axis vertically relative to gravity indicates the applied force does not correspond to a user opening the laptop. In some embodiments, an electronic device is considered to be oriented horizontally when the lower surface of the second portion of the electronic device is within 20° of horizontal relative to a direction of gravity. In some embodiments, an electronic device is considered to be oriented horizontally when the lower surface of the second portion of the electronic device is within 10° of horizontal relative to a direction of gravity. In some embodiments, an electronic device is considered to be oriented horizontally when the lower surface of the second portion of the electronic device is within 5° of horizontal relative to a direction of gravity. In some embodiments, an electronic device is considered to be oriented horizontally when the lower surface of the second portion of the electronic device is within 2° of horizontal relative to a direction of gravity.

In some examples, a user holding a laptop device on their lap holds the laptop at approximately a 5° to 10° slope away from the user. In some examples, a school desk or auditorium table has a slope up to 20° toward the user.

In some embodiments, the resistive force is reduced when both a shear force and a reduction in the normal force on the underside are detected. For example, a purely radial component (e.g., a shear force) measured by the sensor(s) may not indicate an opening force without a rotational component (e.g., lifting force) measured, as the purely radial component may be a user placing the device in a backpack. In another example, a purely rotational component (e.g., lifting force measured by the sensor(s) may not indicate an opening force without a radial component, as the purely rotational component may be a user picking up the electronic device.

In some embodiments, the resistive force is reduced when one of a shear force and a reduction in the normal force on the underside are detected. For example, an optical sensor may detect a displacement of the electronic device relative to a surface upon which the electronic device rests and reduce the resistive force.

In some embodiments, reducing the resistive force includes lowering the rotational resistance of the hinge of the electronic device and/or lowering the closure force of the magnetic elements of the electronic device. In some embodiments, reducing the resistive force includes lowering the net resistive force by applying an assistive force to counteract at least a portion of the rotational resistance of the hinge and/or the closure force of the magnetic elements.

In some embodiments, lowering the rotational resistance of the hinge of the electronic device includes changing a torque applied by the hinge through a clutch system. For example, a hinge may include one or more clutches positioned in the hinge to engage or disengage frictional elements in the hinge. In some embodiments, lowering the rotational resistance of the hinge of the electronic device includes changing a torque applied by the hinge through eddy currents between magnets in the hinge. For example, changing an electrical current or voltage through a coil in the hinge may alter the rotational resistance of the hinge. In some embodiments, lowering the rotational resistance of the hinge includes change a quantity or property of a fluid in the hinge. For example, a fluid in the hinge can produce a rotational resistance and applying a magnetic field or electrical current tot the fluid can change the viscosity of the fluid, thereby altering the rotational resistance of the hinge.

In some embodiments, reducing the resistive force includes lowering a closure force (e.g., an attractive force) between a first magnetic element in the first portion of the electronic device and a second magnetic element in the second portion of the electronic device. In some embodiments, one or both of the first magnetic element and second magnetic element is an electromagnet. The closure force may be reduced by reducing a current applied to the electromagnet, thereby reducing the strength of the magnetic field of the electromagnet. In some embodiments, a direction of the applied current can be changed, such that a polarity of the electromagnetic is changed. Changing the polarity of the electromagnetic can change the previously attractive force to a repulsive force.

In some embodiments, reducing the attractive force between the first magnetic element and second magnetic element includes changing an alignment of the first magnetic element and the second magnetic element. In some embodiments, the first magnetic element and the second magnetic element are aligned in plane with one another between the first portion and the second portion of the electronic device. In some embodiments, the attractive force between the first magnetic element and the second magnetic element may be reduced by translating one or both of the first magnetic element and the second magnetic element transversely away from one another. Moving the first magnetic element and the second magnetic element away from one another may reduce the attractive force therebetween. Moving the magnetic fields of the first magnetic element and the second magnetic element out of alignment may further reduce the attractive force therebetween.

In some embodiments, the first magnetic element and the second magnetic element each include a plurality of magnets with alternating North and South pole orientations. In the closure state, the alternating poles of the first magnetic element are aligned with opposite alternating poles (North-South/South-North) of the second magnetic element producing a net attractive force. When translated transversely, the alternating poles of the first magnetic element may move into alignment with matching alternating poles (N-N/S-S) of the second magnetic element, producing a net repulsive force.

In some embodiments, the attractive force between the first magnetic element and the second magnetic element is reduced by rotating one of the first magnetic element and the second magnetic element relative to one another. For example, when the first magnetic element and the second magnetic element are in a closure state, a North pole of the first magnetic element and South pole of the second magnetic element may be aligned and oriented toward one another, producing an attractive force. When an opening force is detected, one of the first magnetic element and the second magnetic element may be rotated such that the same magnetic poles (N-N/S-S) are oriented toward one another, producing a repulsive force.

In some embodiments, reducing the resistive force includes applying an assistive force to counteract and/or overcome the resistive force. In some embodiments, the assistive force includes a magnetic repulsive force such described in relation to translating or rotating magnets of the closure mechanism. In some embodiments, the assistive force includes changing the polarity of an electromagnet from an attractive force to a repulsive force and/or applying a current to an additional electromagnetic to active the additional electromagnet and apply a repulsive force.

In some embodiments, the assistive force includes applying a mechanical force to move the first portion and second portion apart from one another in an opening rotational direction. For example, an attractive magnetic force between the first portion and second portion decreases rapidly in relation to distance therebetween. Therefore, the resistive force may reduce rapidly after the initial opening of the electronic device.

The mechanical force may be applied by actuator that pushes the first portion away from the second portion in the opening rotational direction. In some embodiments, the actuator is a linear actuator. In some embodiments, the actuator is a piston and cylinder. In some embodiments, the actuator is an electric motor that moves or rotates an arm to apply a force between the first portion and second portion.

In some embodiments, the resistive force is reduced until the first portion and second portion move apart from one another a predetermined amount. In some embodiments, the resistive force is reduced through a portion of the rotation range of motion around the hinge axis from the closed state in a range having an upper value, a lower value, or upper and lower values including any of 5°, 10°, 15°, 20°, 25°, 30°, 40°, 50°, 60°, 75°, 90°, 120°, or any values therebetween. In some embodiments, the resistive force is reduced through less than the first 5° of rotation around the hinge axis in the opening direction. In some embodiments, the resistive force is reduced through less than the first 15° of rotation around the hinge axis in the opening direction. In some embodiments, the resistive force is reduced through less than the first 30° of rotation around the hinge axis in the opening direction. In some embodiments, the resistive force is reduced through less than the first 45° of rotation around the hinge axis in the opening direction. In some embodiments, the resistive force is reduced through less than the first 90° of rotation around the hinge axis in the opening direction. In some embodiments, the resistive force is reduced through the entire range of motion.

In some embodiments, the resistive force is reduced upon detecting a force initiating opening of the electronic device until movement of the first portion relative to the second portion stops. For example, the resistive force may be reduced while opening the electronic device until the user stops opening the electronic device at any angular relationship of the first portion relative to the second portion. The resistive force may then return to the original resistive force.

In some embodiments where reducing the resistive force includes reducing a rotational resistance of the hinge, restoring the resistive force after the first portions stops moving relative to the second portion aids in the hinge holding a first portion in the user's desired position. In some embodiments where reducing the resistive force includes reducing a magnetic attraction force and/or generating a magnetic repulsion force, restoring the resistive force assists in closing of the electronic device.

In some embodiments, the sensor(s) of the electronic device are located on an underside of the electronic device. In some embodiments, the sensor(s) is a shear force sensor located in a foot of the electronic device. The shear force sensor measures a shear force applied to the foot by a radial force on the first portion. The shear force sensor may be located in (e.g., embedded in) the foot to measure a deformation of the foot under a shear force. In some embodiments, the shear force sensor is positioned in a layer between the foot and the body of the second portion to measure a shear strain between the foot and the body.

The electronic device may include a shear force sensor in a plurality of feet. In some embodiments, shear force sensors are located in the front feet of the electronic device proximate the edge opposite the hinge. In some embodiments, shear force sensors are located in the rear feet of the electronic device proximate the hinge. In some embodiments, the shear force sensor is located in all feet of the electronic device. In some embodiments, the electronic device includes a sheet of high friction material positioned on the underside, such that the sheet provides the friction force with a surface upon which the electronic device rests. In such embodiments, the shear force sensors are positioned in the electronic device between the sheet and the lower surface of the second portion. In some embodiments, the shear force sensors are located in the second portion to measure a shear force applied to the lower surface.

In some embodiments, the underside of the electronic device includes compression force sensor. The compression force sensors may allow the electronic device to detect and/or measure a lifting force applied to the electronic device. In some embodiments, a first compression force sensor located in a front foot and a second compression force sensor located in a rear foot allows the electronic device to measure a lifting force applied to the front of the electronic device. For example, at rest in the closed state, the compression force sensors may measure approximately the same force at the front of the second portion and at the rear of the second portion. A lifting force applied to the front edge (e.g., when initially opening the electronic device) may reduce the force measured by the front compression force sensor more relative to the rear compression force sensor.

In some embodiments, the sensor(s) are optical sensors that are located in the underside of the second portion and oriented downward toward the surface upon which the electronic device rests. In some embodiments, the one or more optical sensors include an infrared light optical sensor with an infrared light source having a peak emission in the infrared portion of the light spectrum. In some embodiments, the one or more optical sensors include a visible light optical sensor with a visible light source having a peak emission in the visible portion of the light spectrum to produce a visible color of light or white light. The optical sensors may a force applied to the electronic device by measuring movement of the electronic device relative to surface. Movement of the electronic device on the surface indicates a radial force applied to the electronic device. In some embodiments, an opening force applied to the electronic device produces a rotational movement of the electronic device relative to the surface upon which it rests. A plurality of optical sensors may allow the electronic device to measure both translational and rotational displacement.

In some embodiments, an accelerometer, a gyroscope, or other orientation measurement device measures an orientation of the electronic device. When the electronic device is measured to be horizontal on a surface and the optical sensors indicate the device is moving relative to the surface, the movement may be related to an opening force applied by a user.

In some embodiments, the electronic device further includes a force sensor positioned in the first portion and/or in the hinge. The force sensor in the first portion and/or hinge can provide additional confirmation that a force and/or a movement detected by the sensor(s) in the underside of the electronic device is an opening force. For example, a user may push a laptop across a desk to move the laptop without intending to open the laptop. While the shear force sensor(s) and/or optical sensor(s) may measure a shear force and/or displacement of the laptop relative to the surface of the desk, a force sensor located in, for example, a bezel of the first portion or the hinge may confirm the force is applied to the first portion in a manner to open the electronic device.

In some embodiments, the resistive force in the closed state is in a range having an upper value, a lower value, or upper and lower values including any of 2 N, 3 N, 4 N, 5 N, 7.5 N, 10 N, 12.5 N, 15 N, or any values therebetween. In some embodiments, the resistive force in the closed state is greater than 2 N. In some embodiments, the resistive force in the closed state is less than 15 N. In some embodiments, the resistive force in the closed state is between 2 N and 15 N. In some embodiments, the resistive force in the closed state is between 5 N and 10 N.

In some embodiments, an electronic device according to the present disclosure reduces the resistive force in response to determining a user is opening the electronic device by an amount in a range having an upper value, a lower value, or upper and lower values including any of 2 N, 3 N, 4 N, 5 N, 7.5 N, 10 N, 12.5 N, 15 N, or any values therebetween. In some embodiments, the resistive force is reduced by greater than 2 N. In some embodiments, the resistive force is reduced by less than 15 N. In some embodiments, the resistive force is reduced by between 2 N and 15 N. In some embodiments, the resistive force is reduced by between 5 N and 10 N.

In some embodiments, the reduction in force is proportional to the measured opening force. For example, the reduction of the resistive force may be proportional to the measured rotational component of the opening force. In some embodiments, an electronic device according to the present disclosure reduces the resistive force by a proportion of a measured rotational component (e.g., lifting force) of an opening force in a range having an upper value, a lower value, or upper and lower values including any of 10%, 20%, 30%, 40%, 50%, 60%, 70%, 80%, 90%, or 100%, or any values therebetween. In some embodiments, the resistive force is reduced by greater than 20% of the rotational component of the opening force. In some embodiments, the resistive force is reduced by less than 100% of the rotational component of the opening force. In some embodiments, the resistive force is reduced by between 20% and 100% of the rotational component of the opening force. In some embodiments, the resistive force is reduced by between 40% and 60% of the rotational component of the opening force.

In some embodiments, the reduction in force is proportional to the measured movement of the electronic device by an optical sensor in the underside of the device. For example, the reduction of the resistive force may increase as more displacement is detected. In some embodiments, an electronic device according to the present disclosure reduces the resistive force by a relative amount of a measured displacement to a maximum displacement in a range having an upper value, a lower value, or upper and lower values including any of 5 millimeters, 1 centimeter (cm), 2 cm, 3 cm, 4 cm, 6 cm, 8 cm, 10 cm, or any values therebetween. In some embodiments, an electronic device reduces the resistive force according to a ratio of the measured displacement (e.g., by the optical sensor(s)) and the maximum value. For example, for a maximum displacement of 10 cm, a measured 1 cm displacement results in a 1:10 (10%) reduction in the resistive force. In some examples, for a maximum displacement of 2 cm, a measured 1 cm displacement results in a 1:2 (50%) reduction in the resistive force.

In at least some embodiments, an electronic device according to the present disclosure improves a user experience by simplifying the opening of the device. For example, a hinge may firmly hold the display cover of a laptop in position, while the detection and identification of a user opening the display cover may reduce a resistive force and allow the user to move the display cover relative to the base more easily. This may allow a user to open and/or close the electronic device more easily using a single hand. In some embodiments, an electronic device according to the present disclosure may limit the sliding of an electronic device across a surface upon which the device rests to no more than 2 centimeters (cm), 5 cm, 10 cm, or other value.

The present disclosure relates to systems and methods for dynamically adjusting an opening force of an electronic device according to at least the examples provided in the sections below:

1. A method of controlling opening resistance in an electronic device, the method comprising:

at the electronic device (e.g., electronic device 100, 300, 400):

maintaining (e.g., "maintaining . . . " 134) the electronic device in a closed state via a resistive force, wherein the resistive force is applied by at least one of: a hinge (e.g., hinge 112, 412) of the electronic device, and magnetic elements (e.g., magnetic elements 120-1, 120-2, 220-1, 220-2) of the electronic device;

detecting (e.g., "detecting . . . " 136), via a sensor on an underside (e.g., underside 452) of the electronic device, a force applied to a first portion (e.g., first portion 102, 202, 302, 402) of the electronic device;

determining (e.g., "determining . . . " 138) that the force corresponds to a user initiating opening of the electronic device; and in accordance with the determination, reducing (e.g., "reducing . . . " 140) the resistive force to assist the user in opening the electronic device.

2. The method of section 1, wherein the sensor comprises an optical sensor (e.g., optical sensor 458), and wherein detecting the force comprises detecting a displacement of the second portion relative to a surface upon which the electronic device rests.

3. The method of section 1 or 2, wherein the sensor comprises a force sensor (e.g., force sensor 462), and wherein detecting the force comprises identifying a force applied to a bezel (bezel 114, 414) of the first portion.

4. The method of any of sections 1-3, wherein the sensor comprises a force sensor (e.g., shear force sensor 456), and wherein detecting the force comprises measuring a force applied to a foot (e.g., feet 128, 428-1, 428-2) of the electronic device.

5. The method of any of sections 1-4, wherein the sensor comprises a shear force sensor (e.g., shear force sensor 456) within a foot of the electronic device, and wherein detecting the force comprises measuring a shear force applied to the second portion (e.g., second portion 104, 304, 404) relative to a surface upon which the electronic device rests.

6. The method of any of sections 1-5, further comprising measuring an orientation (e.g., with orientation sensor 460) of the electronic device relative to a direction of gravity; and determining that the electronic device is at a particular orientation, wherein reducing the resistive force is further in accordance with a determination that the electronic device is at the particular orientation.

7. The method of any of sections 1-6, wherein reducing the resistive force includes reducing a rotational resistance of the hinge.

8. The method of any of sections 1-7, wherein reducing the resistive force includes applying an assistance force (e.g., repulsive force 244, assistive force 350) in an opening rotational direction of the first portion relative to the second portion.

9. The method of any of sections 1-8, wherein maintaining the electronic device in the closed state includes aligning one or more first magnets (e.g., first magnetic element 220-1) in the first portion with one or more second magnets (e.g., second magnetic element 220-2) in a second portion such that there is an attractive force between the first portion and the second portion; and wherein reducing the resistive force comprises realigning at least one of the first and second magnets such that there is a repulsive force between the first portion and the second portion.

10. The method of any of sections 1-9, wherein reducing the resistive force comprises adjusting operation of an electromagnet in the first portion or the second portion such that a repulsive force is created between the first portion and the second portion or an attractive force is reduced.

11. The method of any of sections 1-10, wherein the opening resistance is reduced until the first portion stops moving relative to the second portion.

12. The method of any of sections 1-11, wherein the opening resistance is reduced through a portion of the rotational range of motion of the first portion relative to the second portion.

13. The method of any of sections 1-12, further comprising measuring a position of the first portion relative to the second portion and determining the first portion is closed relative to the second portion before reducing the opening resistance.

14. The method of any of sections 1-13, wherein detecting the force includes measuring a rotational component (e.g., rotational component 126) of the force and a radial component (e.g., radial component 124) of the force relative to the hinge.

15. The method of section 14, wherein reducing the opening resistance includes reducing the opening resistance proportionally relative to the radial component.

16. The method of any of sections 1-15, wherein reducing the opening resistance includes reducing the opening resistance below 4.0 Newtons.

17. The method of any of sections 1-16, further comprising detecting a second force, determining that the second force does not correspond to a user opening the device, and forgoing reducing the resistive force in accordance with the determination that the second force does not correspond to the user opening the device.

18. A non-transitory computer readable medium, that, when executed by a processor, cause the processor to perform any of the methods of sections 1-17.

19. An electronic device, the electronic device comprising:
- a first portion (e.g., first portion 102);
- a hinge (e.g., hinge 112);
- a second portion (e.g., second portion 104), where the first portion is movably connected to the second portion by the hinge, where the first portion is rotatable around an axis of the hinge by application of a force;
- means for measuring at least one component of the force (e.g., shear force sensor 456, force sensor 462, optical sensor 458);
- means for reducing an opening resistance of the first portion relative to the second portion (e.g., first magnetic element 220-1, second magnetic element 220-2, actuator 346);
- a processor (e.g., 106) in data communication with the means for measuring and means for reducing the opening resistance; and
- a computer-readable storage medium in data communication with the processor, the hardware storage device having instructions stored thereon that, when executed by the processor, cause the processor to perform the method of any of sections 1-17.

20. The electronic device of section 19, wherein the sensor comprises an optical sensor (e.g., optical sensor 458) positioned on and underside of the second portion and oriented away from the first portion to measure a movement of the second portion relative to a surface upon which the device rests.

21. The electronic device of section 19 or 20, wherein the sensor includes a force sensor (e.g., shear force sensor 456) positioned in a foot of the second portion.

22. The electronic device of any of sections 19-21, wherein the sensor includes a torque sensor positioned in the hinge.

23. The electronic device of any of sections 19-22, wherein the sensor includes a shear force sensor (e.g., shear force sensor 456) positioned in a foot of the electronic device.

24. The electronic device of section 24, wherein the sensor includes shear force sensors positioned in at least two of the feet of the electronic device.

25. The electronic device of section 24, wherein the foot includes a thermoplastic polyurethane (TPU).

26. The electronic device of sections 23-26, wherein the sensor is embedded in the foot.

27. The electronic device of any of sections 19-26, wherein the means for reducing the opening resistance includes a magnet configured to apply a separation force between the first portion and second portion.

28. The electronic device of any of sections 19-27 further comprising a magnetic latch that applies a closure force between the first portion and the second portion when the electronic device is in a closed position, and wherein the means for reducing the opening resistance includes an electromagnet configured to reduced force the closure force between the first portion and second portion.

29. The electronic device of any of sections 19-28 further comprising a magnetic latch that applies a closure force between the first portion and the second portion when the electronic device is in a closed position, and wherein the means for reducing the opening resistance includes a latch movement mechanism to move part of the magnetic latch to reduce the closure force between the first portion and second portion.

30. The electronic device of any of sections 19-29, wherein the means for reducing the opening resistance includes a fluid in the hinge configured to provide rotational resistance between the first portion and second portion based upon a viscosity of the fluid.

31. The electronic device of any of sections 19-30, wherein the means for reducing the opening resistance includes a clutch in the hinge configured to disengage or reduce engagement of the first portion and the second portion around a hinge axis.

32. The electronic device of any of sections 19-31, wherein the means for reducing the opening resistance includes a mechanical actuator that generates a separation force between the first portion and second portion.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of controlling opening resistance in an electronic device, the electronic device comprising a first portion and a second portion that is movable relative to the first portion around a hinge, the method comprising:
   at the electronic device:
      maintaining the electronic device in a closed state via a resistive force, wherein the resistive force is applied by at least one of: the hinge of the electronic device, and magnets of the electronic device;
      detecting, via a sensor on an underside of the electronic device, a force applied to the first portion of the electronic device;
      determining that the force corresponds to a force that a user may apply to initiate opening of the electronic device; and
      in accordance with the determination, reducing the resistive force to assist the user in opening the electronic device.

2. The method of claim 1, wherein the sensor comprises an optical sensor, and wherein detecting the force comprises detecting a displacement of the second portion relative to a surface upon which the electronic device rests, the displacement being caused by the force.

3. The method of claim 1, wherein the sensor comprises a force sensor, and wherein detecting the force comprises identifying a force applied to a bezel of the first portion.

4. The method of claim 1, wherein the sensor comprises a force sensor, and wherein detecting the force comprises measuring a force applied to a foot of the electronic device.

5. The method of claim 1, or wherein the sensor comprises a shear force sensor within a foot of the electronic device, and wherein detecting the force comprises measuring a shear force applied to the second portion relative to a surface upon which the electronic device rests.

6. The method of claim 1, further comprising:
   measuring an orientation of the electronic device relative to a direction of gravity; and
   determining that the electronic device is at a particular orientation, wherein reducing the resistive force is further in accordance with a determination that the electronic device is at the particular orientation.

7. The method of claim 1, wherein reducing the resistive force includes reducing a rotational resistance of the hinge.

8. The method of claim 1, wherein reducing the resistive force includes applying an assistance force in an opening rotational direction of the first portion relative to the second portion.

9. The method of claim 1, wherein maintaining the electronic device in the closed state includes aligning one or more first magnets in the first portion with one or more second magnets in the second portion such that there is an attractive force between the first portion and the second portion; and
   wherein reducing the resistive force comprises realigning at least one of the first and second magnets such that there is a repelling force between the first portion and the second portion.

10. The method of claim 1, wherein reducing the resistive force comprises adjusting operation of an electromagnet in the first portion or the second portion such that a repelling force is created between the first portion and the second portion or an attractive force is reduced.

11. The method of claim 1, wherein the opening resistance is reduced until the first portion stops moving relative to the second portion.

12. The method of claim 1, wherein the opening resistance is reduced through a portion of the rotational range of motion of the first portion relative to the second portion.

13. The method of claim 1, further comprising measuring a position of the first portion relative to the second portion and determining the first portion is closed relative to the second portion before reducing the opening resistance.

14. A non-transitory computer readable medium, that, when executed by a processor, cause the processor to perform the method of claim 1.

15. An electronic device, the electronic device comprising:
- a first portion;
- a hinge;
- a second portion, where the first portion is movably connected to the second portion by the hinge, where the first portion is rotatable around an axis of the hinge by application of a force;
- means for measuring at least one component of the force;
- means for reducing an opening resistance of the first portion relative to the second portion;
- a processor in data communication with the means for measuring and means for reducing the opening resistance; and
- a computer-readable storage medium in data communication with the processor, the hardware storage device having instructions stored thereon that, when executed by the processor, cause the processor to perform the method of claim 1.

16. The method of claim 1, wherein the sensor comprises a force sensor, and wherein detecting the force comprises identifying a force applied to a bezel of the first portion and wherein detecting the force comprises measuring a force applied to a foot of the electronic device.

17. The method of claim 16, wherein the sensor comprises a shear force sensor within a foot of the electronic device, and wherein detecting the force comprises measuring a shear force applied to the second portion relative to a surface upon which the electronic device rests.

18. The method of claim 17, further comprising:
measuring an orientation of the electronic device relative to a direction of gravity; and
determining that the electronic device is at a particular orientation, wherein reducing the resistive force is further in accordance with a determination that the electronic device is at the particular orientation.

19. The method of claim 18, wherein reducing the resistive force includes reducing a rotational resistance of the hinge.

20. The method of claim 19, wherein reducing the resistive force includes applying an assistance force in an opening rotational direction of the first portion relative to the second portion.

* * * * *